(12) United States Patent
Riccelli

(10) Patent No.: US 11,623,375 B2
(45) Date of Patent: Apr. 11, 2023

(54) PROCESS FOR FORMING CLOSED CELL EXPANDED LOW DENSITY POLYETHYLENE FOAM AND PRODUCTS FORMED THEREBY

(71) Applicant: Innovative Designs, Inc., Pittsburgh, PA (US)

(72) Inventor: Joseph Riccelli, Pittsburgh, PA (US)

( * ) Notice: Subject to any disclaimer, the term of this patent is extended or adjusted under 35 U.S.C. 154(b) by 33 days.

(21) Appl. No.: 16/944,627

(22) Filed: Jul. 31, 2020

(65) Prior Publication Data

US 2021/0039289 A1 Feb. 11, 2021

Related U.S. Application Data

(63) Continuation of application No. 15/610,175, filed on May 31, 2017, now abandoned.

(Continued)

(51) Int. Cl.

| B29C 44/56 | (2006.01) |
|---|---|
| B29C 44/34 | (2006.01) |
| B01D 19/00 | (2006.01) |
| C08J 9/14 | (2006.01) |
| C08J 9/18 | (2006.01) |
| C08J 9/228 | (2006.01) |

(Continued)

(52) U.S. Cl.
CPC ...... *B29C 44/3461* (2013.01); *B01D 19/0005* (2013.01); *B29C 44/3453* (2013.01); *B29C 44/5609* (2013.01); *C08J 9/0023* (2013.01); *C08J 9/141* (2013.01); *C08J 9/18* (2013.01); *C08J 9/228* (2013.01); *B29C 44/505* (2016.11); *B29K 2023/06* (2013.01); *B29K 2023/0633* (2013.01); *B29K 2105/0005* (2013.01); *B29K 2105/046* (2013.01); *B29K 2995/0063* (2013.01); *C08J 2201/03* (2013.01); *C08J 2203/14* (2013.01); *C08J 2205/052* (2013.01); *C08J 2323/06* (2013.01)

(58) Field of Classification Search
CPC ............ B29C 44/3461; B29C 44/5609; B29K 2105/046; B29K 2023/06; B29K 2023/0633; C08J 22/05; C08J 2201/03
See application file for complete search history.

(56) References Cited

U.S. PATENT DOCUMENTS

| 3,067,147 A | 12/1962 | Rubens et al. |
|---|---|---|
| 3,810,964 A | 5/1974 | Ehrenfreund et al. |

(Continued)

*Primary Examiner* — Alison L Hindenlang
*Assistant Examiner* — Debjani Roy
(74) *Attorney, Agent, or Firm* — Blynn L. Shideler; Krisanne Shideler; BLK Law Group

(57) ABSTRACT

The process for forming closed cell expanded low density polyethylene foam includes the steps of: providing a mixture including low density polyethylene pellets and an effective amount of hydrocarbon scavenger additives or degassing agents, such as glycerides; adding a primary blowing agent comprising one of liquid propane, liquid butane, and combinations thereof, to the mixture and gasifying the blowing agent to expand the low density polyethylene; forming the expanded low density polyethylene into sheets, curing the expanded low density polyethylene until 80%, generally at least 99%, of the primary blowing agent is dissipated from cells within the expanded low density polyethylene forming evacuated closed cell low density polyethylene sheets.

15 Claims, 1 Drawing Sheet

Related U.S. Application Data

(60) Provisional application No. 62/343,309, filed on May 31, 2016.

(51) Int. Cl.
*C08J 9/00* (2006.01)
*B29K 23/00* (2006.01)
*B29C 44/50* (2006.01)
*B29K 105/04* (2006.01)
*B29K 105/00* (2006.01)

(56) References Cited

U.S. PATENT DOCUMENTS

| | | | |
|---|---|---|---|
| 3,966,363 A | 6/1976 | Rowley et al. | |
| 4,110,269 A | 8/1978 | Ehrenfruend | |
| 4,120,923 A | 10/1978 | Kloker et al. | |
| 4,214,054 A | 7/1980 | Watanabe et al. | |
| 4,251,584 A | 2/1981 | van Engelen et al. | |
| 4,347,329 A | 8/1982 | Park | |
| 4,464,484 A | 8/1984 | Yoshimura et al. | |
| 4,649,001 A | 3/1987 | Nakamura et al. | |
| 4,746,564 A | 5/1988 | Shin | |
| 4,952,352 A * | 8/1990 | Shin | C08J 9/0066 264/55 |
| 5,026,736 A * | 6/1991 | Pontiff | B29B 9/06 521/184 |
| 5,034,171 A | 7/1991 | Kiczek et al. | |
| 5,059,376 A | 10/1991 | Pontiff et al. | |
| 5,348,984 A | 9/1994 | Lee | |
| 5,462,974 A | 10/1995 | Lee | |
| 5,554,661 A * | 9/1996 | Chaudhary | C08J 9/122 521/142 |
| 5,844,009 A * | 12/1998 | Hurley | C08J 9/0061 521/142 |
| 6,303,666 B1 | 10/2001 | Yorita et al. | |
| 6,350,512 B1 | 2/2002 | Hurley et al. | |
| 8,429,764 B2 | 4/2013 | Riccelli | |
| 9,573,340 B2 | 2/2017 | Riccelli | |
| 10,100,166 B2 * | 10/2018 | Hayase | C08J 9/0095 |
| 2003/0192481 A1 | 10/2003 | Schulein, Jr. | |
| 2010/0154338 A1 | 6/2010 | Riccelli et al. | |
| 2010/0247855 A1* | 9/2010 | Bletsos | C23C 14/20 428/209 |
| 2018/0000152 A1 | 1/2018 | Riccelli | |

* cited by examiner

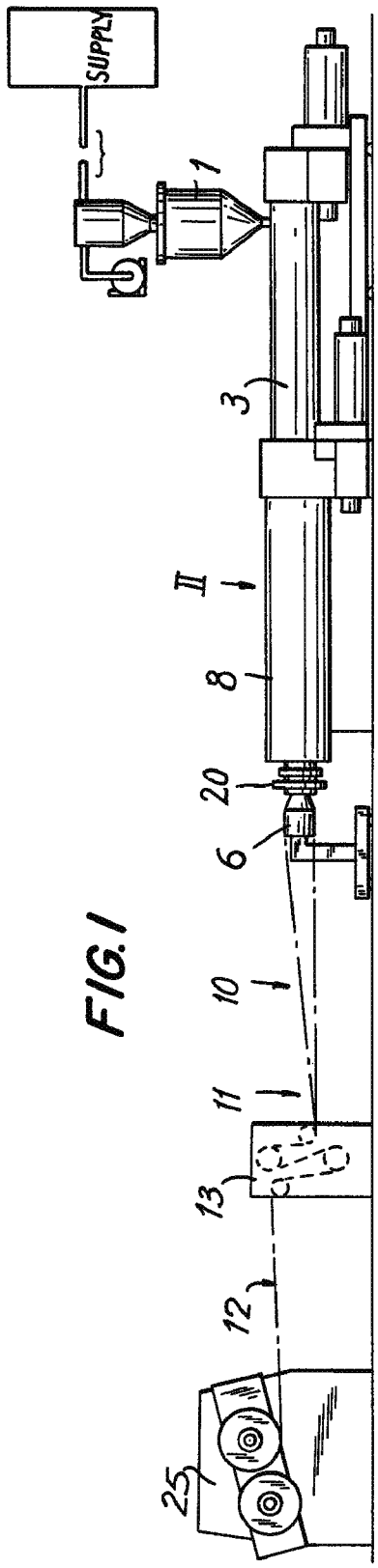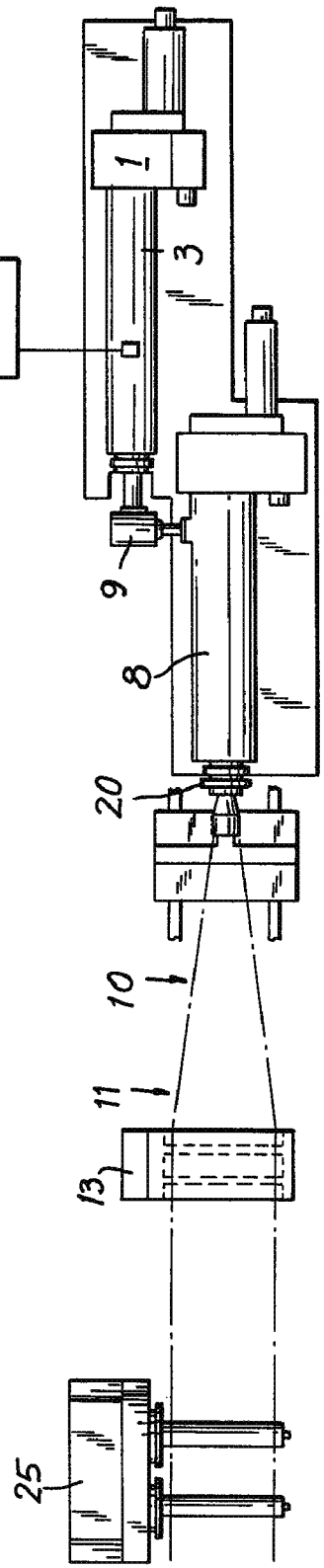

PROCESS FOR FORMING CLOSED CELL EXPANDED LOW DENSITY POLYETHYLENE FOAM AND PRODUCTS FORMED THEREBY

RELATED APPLICATION

The present invention is a continuation of U.S. patent application Ser. No. 15/610,175, field May 31, 2017 and which published as Publication Number 2018-0001522 on Jan. 4, 2018, which application and publication are incorporated herein by reference. U.S. patent application Ser. No. 15/610,175 claims priority of U.S. Provisional Patent Application Ser. No. 62/343,309 entitled "Process for Forming Closed Cell Expanded Low Density Polyethylene Foam and Products Formed Thereby" filed May 31, 2016 which application is incorporated herein by reference.

BACKGROUND OF THE INVENTION

1. Field of the Invention

The present invention relates to low density polyethylene foam and process for making the same.

2. Background Information

Low-density polyethylene (LDPE) is a thermoplastic made from the monomer ethylene. It was the first grade of polyethylene, produced in 1933 by Imperial Chemical Industries (ICI) using a high pressure process via free radical polymerization. Polyethylene foam, also known as PE and PEF, is a semi-rigid, open or closed-cell type of foam with a near-infinite amount of applications.

Thermoplastic foam products, in general, can be produced by a wide variety of processes, of which extrusion is but one, that are in part responsible for the wide variety of foam products available today. Foams range in consistency from rigid materials suitable for structural use to flexible substances for soft cushions and packaging materials. These foams range in cellular formation from open or interconnecting-cell foams to closed or uni-cell foams. The cell structure may range from large to fine. Electrical, thermal, mechanical, and chemical properties can be varied within wide limits depending on the thermoplastic resin composition and the method chosen to create the foam. Foamed thermoplastics range in density anywhere from about 10 kg/m$^3$ to over 1,000 kg/m$^3$, although the latter perhaps more properly are called microcellular structures. True foams are considered to have a density of less than about 800 kg/m$^3$.

Many methods have been developed for the manufacture of foamed thermoplastics. See for example, in U.S. Pat. Nos. 6,350,512, 6,303,666, 5,844,009, 5,554,661, 5,462,974, 5,348,984, 5,059,376, 5,034,171, 4,952,352, 4,746,564, 4,649,001, 4,464,484, 4,347,329, 4,251,584, 4,214,054, 4,120,923, 4,110,269, 3,966,363, 3,810,964, and 3,067,147 which are incorporated herein by reference. The methods generally can be classified into three groups: 1) methods for adding a gaseous "blowing agent" to the thermoplastic during processing, 2) methods for producing a gaseous blowing agent in the thermoplastic during processing, and 3) methods for forming a thermoplastic mass from granules to obtain a cellular structure. Similar blowing agents sometimes are used in the various methods to produce foams. However, it has been proposed that the effectiveness of a particular blowing agent varies considerably depending on the thermoplastic resin composition, the method chosen, the process conditions, the additives used, and the product sought.

As noted above expanded low density polyethylene foam has a wide number of applications. A co-inventor of the instant invention utilized LDPE foam in the construction of a house wrap as disclosed in patent publication 2010-0154338, which is incorporated herein by reference. A co-inventor of the instant invention utilized LDPE foam in the construction of a composite fabric material as disclosed in U.S. Pat. Nos. 8,429,764 and 9,573,340, which are incorporated herein by reference. In house wrap applications in particular, and in other applications such as fabrics used for outerwear, the exceptional thermal insulating properties of LDPE foam is advantageous, but naturally there is a desire to further improve upon these characteristics.

There remains a need in the industry to develop closed cell expanded low density polyethylene foam with superior thermal insulation characteristics and develop a process for making the same.

SUMMARY OF THE INVENTION

The various embodiments and examples of the present invention as presented herein are understood to be illustrative of the present invention and not restrictive thereof and are non-limiting with respect to the scope of the invention.

It is an object of the present invention to eliminate the above-mentioned drawbacks by providing a foamed, expanded low density polyethylene possessing superior thermal resistance characteristics. The process of the present invention includes the steps of: providing a mixture including low density polyethylene pellets and an effective amount of glycerides as a degassing agent; adding a primary blowing agent comprising one of liquid propane, liquid butane, and combinations thereof, to the mixture and gasifying the blowing agent to expand the low density polyethylene; forming the expanded low density polyethylene into sheets, curing the expanded low density polyethylene until 80%, preferably at least 95% and more preferably at least 99% of the primary blowing agent is dissipated from cells within the expanded low density polyethylene forming evacuated closed cell low density polyethylene sheets.

The process of forming low density expanded polyethylene foam according to according to one aspect of the invention provides wherein the effective amount of glyceride is about 0.3-5%, preferably 1-4%, and more preferably about 2.5% of the low density polyethylene by weight.

The process of forming low density expanded polyethylene foam according to one aspect of the invention provides that the curing step is at least two days, preferably at least 15 days, and generally about 30 days, before closed cell low density polyethylene sheets are subsequently processed.

One aspect of the invention provides a process of forming low density expanded polyethylene foam comprising the steps of: providing a mixture including low density polyethylene pellets and hydrocarbon scavenger additive in an amount of about 0.3-5% of the low density polyethylene by weight; adding a primary blowing agent comprising one of liquid propane, liquid butane, and combinations thereof, to the mixture and gasifying the blowing agent to expand the low density polyethylene; forming the expanded low density polyethylene into sheets; and curing the expanded low density polyethylene until 80% of the primary blowing agent is dissipated from cells within the expanded low density polyethylene forming closed cell low density polyethylene sheets. The process of forming low density expanded polyethylene foam according to one aspect of the invention provides wherein the hydrocarbon scavenger additive include glycerides, activated carbon, sodium bicarbonate, graphite, silica gels, zeolites, diatomaceous earth, petro-gels, and mixtures of the above.

One aspect of the invention provides an expanded low density polyethylene sheets in which at least 80%, preferably at least 95% and more preferably at least 99% of the blowing agents are dissipated from cells within the expanded low density polyethylene forming evacuated closed cell low density polyethylene sheet.

These and other advantages of the present invention will be clarified in the description of the preferred embodiments taken together with the attached figures.

BRIEF DESCRIPTION OF THE FIGURES

FIG. 1 is a schematic plan view of a system for implementing the process of the present invention; and FIG. 2 is a schematic top view of the system of FIG. 1 taken in the direction of the arrow II shown in FIG. 1.

DESCRIPTION OF THE PREFERRED EMBODIMENTS

In summary, the present invention relates to a process of forming expanded closed cell low density polyethylene foam comprising the effective steps of: providing a mixture including low density polyethylene pellets and an effective amount of glycerides as a degassing agent; adding a primary blowing agent comprising one of liquid propane, liquid butane, and combinations thereof, to the mixture and gasifying the blowing agent to expand the low density polyethylene; forming the expanded low density polyethylene into sheets, curing the expanded low density polyethylene until 80% of the primary blowing agent is dissipated from cells within the expanded low density polyethylene forming closed cell low density polyethylene sheets.

Low density polyethylene (LDPE) is a thermoplastic, with the formula $(C_2H_4)_n$, which is defined by a density range of 0.910-0.940 g/cm$^3$. It is un-reactive at room temperatures, except by strong oxidizing agents. It is known as being quite flexible, and tough. LDPE has more branching (on about 2% of the carbon atoms) than high density polyethylene (HDPE).

The LDPE molecules are less tightly packed and less crystalline than HDPE because of the side branches, and thus its density is lower. It is typically found as a powder or pellet forms and has a CAS #9002-88-4. U.S. suppliers polyethylene include of AccuStandard Inc; Aceto Corporation; AK Scientific, Inc.; Cambridge Isotope Laboratories, Inc.; CarboMer, Inc.; Dow Chemical Company; EMCO Industrial Plastics, Inc.; HBCChem, Inc.; Pressure Chemical Co.; Scientific Polymer Products, Inc.; and Waterstone Technology, LLC.

Glycerides, more correctly known as acylglycerols, are esters formed from glycerol and fatty acids. Glycerol has three hydroxyl functional groups, which can be esterified with one, two, or three fatty acids to form monoglycerides, diglycerides, and triglycerides.

A monoglyceride is a glyceride in which each glycerol molecule has formed an ester bond with exactly one fatty acid molecule. The more formally correct terms in modern convention are acylglycerol and monoacylglycerol. Any monoacylglycerol is either a 1-monoacylglycerol or a 2-monoacylglycerol, depending on the position of the ester bond on the glycerol moiety. 1-monoacylglycerides possess a chiral centre at carbon 2.

A diglyceride, or diacylglycerol (DAG), is a glyceride consisting of two fatty acid chains covalently bonded to a glycerol molecule through ester linkages. One example is 1-palmitoyl-2-oleoyl-glycerol, which contains side-chains derived from palmitic acid and oleic acid. Diacylglycerols can also have many other combinations of fatty acids attached at either the C-1 and C-2 positions or the C-1 and C-3 positions. 1,2 di-substituted glycerols are always chiral, 1,3 di-substituted glycerols are chiral if the substituents are different from each other. Acceptable diglycerides and monoglycerides suitable for the present invention include those under CAS #91052-47-0, 10303-53-4 and 41670-62-6.

A triglyceride (TG, triacylglycerol, TAG, or triacylglyceride) is an ester derived from glycerol and three fatty acids (tri-+glyceride). There are many different types of triglyceride, with the main division being between saturated and unsaturated types. Saturated fats are "saturated" with hydrogen—all available places where hydrogen atoms could be bonded to carbon atoms are occupied. These have a higher melting point and are more likely to be solid at room temperature. Unsaturated fats have double bonds between some of the carbon atoms, reducing the number of places where hydrogen atoms can bond to carbon atoms. These have a lower melting point and are more likely to be liquid at room temperature. Acceptable triglycerides suitable for the present invention include those under CAS #65381-09-1 and 97794-26-8.

Propane is a three-carbon alkane with the molecular formula $C_3H_8$, a gas, at standard temperature and pressure, but compressible to a transportable liquid. A by-product of natural gas processing and petroleum refining, it is one of a group of liquefied petroleum gases (LP gases). The others include butane, propylene, butadiene, butylene, isobutylene and mixtures thereof. Propane has a Cas #74-98-6.

Butane is an organic compound with the formula $C_4H_{10}$ that is an alkane with four carbon atoms. Butane is a gas at room temperature and atmospheric pressure. The term may refer to either of two structural isomers, n-butane or isobutane (or "methylpropane"), or to a mixture of these isomers. In the IUPAC nomenclature, however, "butane" refers only to the n-butane isomer (which is the isomer with the unbranched structure). Butanes are highly flammable, colorless, easily liquefied gases. Butane has a Cas #106-97-8.

In the present invention FIG. 1 is a schematic plan view of a system for implementing the process of the present invention; and FIG. 2 is a schematic top view of the system of FIG. 1 taken in the direction of the arrow II shown in FIG. 1.

In accordance with the present invention, and as schematically shown in the drawings, a low density polyethylene prepared by conventional process is mixed, for example in a hopper 1, with an effective amount of a glyceride, preferably a monoglyceride, forming a degassing agent, to form a dry mixture (as discussed below, in alternative embodiments the dry mix includes a preliminary auxiliary blowing agent, a surface activation agent, a separation agent, a fire retarding agent, a crosslinking agent to improve strength of the foam, a coloring agent and an anti-discoloration agent). The amounts of the ingredients are generally expressed relative to the amount of the low density polyethylene. The present invention provides an effective amount of glyceride to be about 0.3-5% of the low density polyethylene by weight, and more preferably about 1-4% of the low density polyethylene by weight, and more preferably about 2.5% of the low density polyethylene by weight.

The degassing agent, such as glycerides, may be referenced as a hydrocarbon scavenger additive and the low density polyethylene may be mixed, for example in a hopper 1, with an effective amount of hydrocarbon scavenger additive which can include other materials than glyceride. Hydrocarbon scavenger additives include glycerides, activated carbon, sodium bicarbonate, graphite, silica gels, zeolites, diatomaceous earth, polymer absorbents called "petrogels": polyolefin-based hydrophobic absorbents that demonstrate selective absorption of hydrocarbon (oil) molecules in water, and mixtures of the above, with glycerides and glyceride containing mixtures being preferred. Mixed into the low density polyethylene hydrocarbon scavenger additives that react with the expanded low density polyethylene in a manner that causes short chain molecules to have an affinity for hydrocarbon structures of the primary blowing agent, and draw these variants to oxygen rich environments, namely to the exterior of the composite structure. As the cells deplete, the process slows accordingly and consumes more time to evacuate the remaining hydrocarbon based molecules than when the process was initiated. The present invention provides an effective amount of hydrocarbon scavenger additives to be about 0.3-5% of the low density polyethylene by weight, and more preferably about 1-4% of the low density polyethylene by weight, and more preferably about 2.5% of the low density polyethylene by weight.

The dry mixture is conveyed to a closed heat tunnel 3, where it is processed possibly in a series of stages at different temperatures. A conventional thermocouple control box can be used to maintain a particular required temperature in each of the processing stages in the heat tunnel 3.

A conventional coil or screw conveys the mixture through the heat tunnel 3. A single screw conveyor is preferred as it yields a homogeneous mixture without damage to the mixture or batch that is possible with double screw systems. In the heat tunnel 3, the dry mixture is heated at a temperature of about 170° C. to form a melted and softened polyethylene mass. In the heating tunnel 3, the primary blowing agent is introduced at 7 into the polyethylene mass to subject the mass to cell expansion. This primary blowing agent is introduced at a suitable pressure.

The preferred primary blowing agent is propane, however butane or a mixture of propane and butane may be used. When using liquid propane as the primary blowing agent an effective amount of propane is about 15-50% of the low density polyethylene by weight, and more preferably about 20-40% of the low density polyethylene by weight, and more preferably about 24-28% of the low density polyethylene by weight. It is possible that other liquid petroleum gases and mixtures thereof may be utilized but propane, butane and mixtures thereof have been proven to be effective. Another advantage to using liquid propane (or butane) is its inexpensiveness and availability.

After the introduction of the primary blowing agent and expansion of the polyethylene mass, the mass is subjected, within the heating tunnel, to a temperature of about 100° C., wherein it begins to cool. Treatment of about 100° C. prepares the mass for proper and efficient cutting. This completes the heating and blowing process.

The expanded mass continues its travel through a second portion 8 of the heating tunnel which typically does not have any coil or screw therein. In this second portion 8 of the heating tunnel, a desired quantity of the expanded mass is cut, for example, by a conventional cutting blade 9. The expanded mass is still in a softened state. The desired quantity depends, of course, on the size of the final sheet or tube desired. The cut, expanded mass is next subjected to a temperature of about 105° C. in the heating tunnel and extruded through a die and mandrel 20 into a free expansion zone 10 and cooling zone 11 at atmospheric pressure and room temperature. The temperature of the mass should be raised slightly after cutting because a temperature of about 100° C. is too cool for proper extruding. After extrusion, the foamed polyethylene mass expands naturally in the atmosphere, but not explosively, and cools at room temperature for a short period, e.g., a few seconds. The cooling mass of polyethylene is then formed into a sheet 12 by conventional rollers 13 the thickness being determined by the desired end use of the product.

The sheet 12 can then be wound on rolls 25 after which it is maintained at room temperature (typically 20° C. to 30° C., preferably about 25° C.) for a curing period of 1-30 days. The cells of the expanded mass are degassed as entrapped blowing agent work its way out of the cells. Typically 80% of the primary blowing gas is degassed from the cells and not in the sheet within a few days, namely at least two days, and at least 95% of the primary blowing gas is degassed from the cells and not in the sheet by 15 days and more than 99% (actually more than 99.9%) of the primary blowing gas is degassed from the cells and not in the sheet by 30 days. The closed cell low density polyethylene sheet of the present invention is available for subsequent processing into other products such as a house wrap or fabric sheet when 80% of the primary blowing agent is degassed form the sheet 12. The sheet 12 must be sufficiently degassed, namely at least 80%, preferably at least 95% and more preferably at least 99% of the primary blowing agent before the sheet 12 is subsequently processed.

Testing of the sheet formed according to the present invention using propane as the primary blowing agent with a curing time of 15 days yielded no trace amounts of butane in the samples tested. The testing was performed by Vaper Analysis by the Material Characterization Services LLC at the Oneida Research Services facility in Englewood Colo. in August 2016. The test was performed three times and utilized two control samples. The concentrations were measured in parts per million, wherein measurements of Argon and CO2 being registered in separate control samples at levels as low as 7 parts per million evidenced the accuracy of the testing, and 0 parts per million of the blowing agent were found in the samples of the invention sheet 12 tested. With the accuracy of the testing performed this yields a degassing of greater than 99.9993% of the primary blowing agent.

During the mixing step, additives can be added in appropriate amounts to impart additional characteristics to the final product, such as a fireproofing anti-inflammatory agent such as tin or a bromine based flame retardant. A further additive include about 0.1% to about 0.2% by weight of the polyethylene of cross linking agents such as azobisformamide (ABFA) or dicumyl peroxide, which can be added in powder form to increase the resistance of the final product to tearing, as well as about 0.1% of an ultra-violet absorber to prevent discoloration. Optionally, a separating agent may be included in the initial mixing step. A suitable separating agent to be initially mixed with the low density polyethylene is ZnC. The separating agent, added preferably in powder form, aids in preventing the LDPE from sticking to the coil 5 or walls of the heating tunnel 3. The amount of separating agent added is substantially about 0.3% by weight of the polyethylene. The additives to the dry mix may be in the form of a known Masterbatch (MB) component, which generally is a solid or liquid additive for plastic used for coloring plastics (color masterbatch) or imparting other properties to plastics (additive masterbatch). Masterbatch is a concentrated mixture of pigments and/or additives encapsulated during a heat process into a carrier resin which is then cooled and cut into a granular shape. Color Masterbatch, generally 1-5% by weight of the polyethylene, allows the processor to color raw polymer economically during the plastics manufacturing process.

Additionally the dry mix can include an auxiliary preliminary blowing agent. Suitable auxiliary preliminary blowing agents to be initially mixed with the low density polyethylene, preferably in powder form, include axodicarbonamide N,N'-dinitrosopentamethylene-tetramine, (commercially-available as Unicel NDX, gasifying temperature of about 195° C.), and 4,4' Oxybis (commercially-available as Celogen OT, gasifying temperature of about 150° C. Azodicarbonamide, or azo(bis) formamide, is a chemical compound with the molecular formula $C_2H_4O_2N_4$ with a Cas #123-77-3 and a gasifying temperature of about 195° C. N,N'-dinitrosopentamethylene-tetramine has a Cas #101-25-7 and also has a gasifying temperature of about 195° C. 4,4' Oxybis is a chemical compound with the molecular formula $C_4H_{10}O_3$ with a Cas #111-46-6 and a gasifying temperature of about 150° C. The amount of auxiliary preliminary blowing agent added is about 0.5-2%, and preferably about 1% by weight of the polyethylene. Azodicarbonamide is the preferred initial auxiliary blowing agent.

With the use of an initial auxiliary blowing agent, a surface activation agent may also be initially mixed with the low density polyethylene, preferably in powder form, and suitable surface activation agents include zinc oxide, cadmium oxide and calcium carbonate. The surface activation agent is added in an amount ranging from about 0.1 to about 0.2% by weight of the polyethylene. The surface activation agent performs several important functions. First, it activates the blowing process while preventing too rapid an expansion of the LDPE cells during initial blowing. Secondly, it keeps the temperature in the heating tunnel 3 down during the initial blowing process. For example, where azodicabonamide is used as the auxiliary blowing agent, the surface activation agent assists in maintaining a temperature of around 150° C. in the relevant stage of the heating tunnel 3. Absent this agent, the gasified blowing agent would raise the temperature to around 196° C.

The use of the auxiliary blowing agent allows the mass to be heated and mixed to form a homogeneous mixture then heated to gasify the preliminary auxiliary blowing agent in a first blowing step, then the partially expanded mass is generally cooled prior to being reheated to the appropriate temperature for the blowing with the primary blowing agent discussed above.

With the use of the use of the auxiliary blowing agent the total time in the heating tunnel 3 takes generally from about 30 minutes to about 1 hour to complete. The auxiliary blowing agent, if used, can be considered as part of the primary blowing agent for degassing purposes whereby the sheet 12 must be sufficiently degassed, namely at least 80%, preferably at least 95% and more preferably at least 99% of the blowing agents (including both the primary and the auxiliary blowing agents if an auxiliary blowing agent is used) before it is subsequently processed.

The closed cell expanded low density polyethylene sheet formed by the present invention can be formed into a variety of products but it is particularly well suited for products utilizing high thermal resistance (without exposure to extreme high temperatures that would melt the foam) and flexibility. Some of these include a composite house wrap as outlined in patent publication 2010-0154338, which is incorporated herein by reference.

Without being limited to theory it is believed that the process of the invention create a firmer cell that keeps the cell structure from collapsing and allows the blowing agent to fill the cells and then evacuate through hydrocarbon-philic chemistry most of the cell structures without collapsing them and, therefore, yields an effectively evacuated cell or vacuum (or technically partial vacuum). A vacuum is the best form of insulation and the process results in an extremely thin material which is highly insulating. By creating micro cells that are semi-rigid and have or form a vacuum, the house wrap becomes advantageous for the building industry. With stacking these "evacuated cells" on top of each other and creating a barrier to trap heat or air conditioned air. A half inch multiple extruded composite house wrap could produce an R30 product.

Another particularly useful product is utilizing the LDPE foam in the construction of a composite fabric material as disclosed in U.S. Pat. No. 8,429,764, which is incorporated herein by reference.

Whereas particular embodiments of the invention have been described above for purposes of illustration, it will be evident to those skilled in the art that numerous variations of the details of the present invention may be made without departing from the spirit and scope of the present invention.

What is claimed is:

1. A process of forming low density expanded polyethylene foam comprising the steps of:
   providing a mixture including low density polyethylene pellets and an effective amount of a hydrocarbon scavenger additive as a degassing agent;
   adding a primary blowing agent to the mixture in an amount about 20-40% of the low density polyethylene by weight, wherein the primary blowing agent is comprising one of liquid propane, liquid butane, and combinations thereof, and gasifying the blowing agent to expand the low density polyethylene;
   forming the expanded low density polyethylene into sheets, and
   curing the expanded low density polyethylene at a temperature between 20° C. to 30° C. for at least 15 days until at least 95% of the primary blowing agent is dissipated from cells within the expanded low density polyethylene without collapsing the cells and forming evacuated closed cell low density polyethylene sheets with at least a partial vacuum within the evacuated cells.

2. The process of forming low density expanded polyethylene foam according to claim 1 wherein the hydrocarbon scavenger additive comprises glycerides and wherein the curing step is completed before the closed cell low density polyethylene sheets are subsequently processed.

3. The process of forming low density expanded polyethylene foam according to claim 1 wherein the hydrocarbon scavenger additive comprises glycerides and wherein at least 99% of the primary blowing agent is dissipated from cells within the expanded low density polyethylene before the closed cell low density polyethylene sheets are subsequently processed into a composite house wrap.

4. The process of forming low density expanded polyethylene foam according to claim 1 wherein the hydrocarbon scavenger additive comprises glycerides and wherein the effective amount of glyceride is about 0.3-5% of the low density polyethylene by weight.

5. The process of forming low density expanded polyethylene foam according to claim 1 wherein the effective amount of glyceride is about 1-4% of the low density polyethylene by weight.

6. The process of forming low density expanded polyethylene foam according to claim 1 wherein the hydrocarbon scavenger additive comprises glycerides and wherein the effective amount of glyceride is about 2.5% of the low density polyethylene by weight and wherein the closed cell low density polyethylene sheets are subsequently processed into a composite house wrap.

7. The process of forming low density expanded polyethylene foam according to claim 1 wherein the hydrocarbon scavenger additive comprises glycerides and wherein the curing step is completed before the closed cell low density polyethylene sheets are subsequently processed into a composite house wrap.

8. The process of forming low density expanded polyethylene foam according to claim 1 wherein the hydrocarbon scavenger additive comprises glycerides and wherein the curing step is completed before the closed cell low density polyethylene sheets are subsequently processed into a composite house wrap.

9. The process of forming low density expanded polyethylene foam according to claim 1 wherein the hydrocarbon scavenger additive comprises glycerides and wherein the curing step is about thirty days before the closed cell low density polyethylene sheets are subsequently processed into a composite house wrap.

10. A process of forming low density expanded polyethylene foam as a composite house wrap comprising the steps of:
providing a mixture including low density polyethylene pellets and a hydrocarbon scavenger additive in an amount of about 0.3-5% of the low density polyethylene by weight;
adding a primary blowing agent to the mixture in an amount about 20-40% of the low density polyethylene by weight, wherein the primary blowing agent is comprising one of liquid propane, liquid butane, and combinations thereof, and gasifying the blowing agent to expand the low density polyethylene;
forming the expanded low density polyethylene into sheets; and
curing the expanded low density polyethylene at a temperature between 20° C. to 30° C. for at least 15 days until at least 95% of the primary blowing agent is dissipated from cells within the expanded low density polyethylene without collapsing the cells and forming evacuated closed cell low density polyethylene sheets with at least a partial vacuum within the evacuated cells, wherein the closed cell low density polyethylene sheets are subsequently processed into a composite house wrap.

11. The process of forming low density expanded polyethylene foam according to claim 10 wherein at least 99% of the primary blowing agent is dissipated from the cells forming evacuated cells within the expanded low density polyethylene before the closed cell low density polyethylene sheets are subsequently processed.

12. The process of forming low density expanded polyethylene foam according to claim 10 wherein the hydrocarbon scavenger additive comprises glycerides, activated carbon, sodium bicarbonate, graphite, silica gels, zeolites, diatomaceous earth, petrogels, or mixtures of the above, and wherein a partial vacuum is formed within the closed cells of the low density polyethylene sheets.

13. The process of forming low density expanded polyethylene foam according to claim 10 wherein the hydrocarbon scavenger additive include glycerides and wherein the effective amount of hydrocarbon scavenger additive is about 1-4% of the low density polyethylene by weight, and wherein a partial vacuum is formed within the closed cells of the low density polyethylene sheets.

14. The process of forming low density expanded polyethylene foam according to claim 10 wherein the hydrocarbon scavenger additive include glycerides and wherein the effective amount of hydrocarbon scavenger additive is about 2.5% of the low density polyethylene by weight, and wherein a partial vacuum is formed within the closed cells of the low density polyethylene sheets.

15. The process of forming low density expanded polyethylene foam according to claim 10 wherein the curing step is about thirty days before the closed cell low density polyethylene sheets are subsequently processed, and wherein a partial vacuum is formed within the closed cells of the low density polyethylene sheets.

\* \* \* \* \*